United States Patent

Schinabeck

[11] 3,976,613
[45] Aug. 24, 1976

[54] COMPOSITION AND PROCESS FOR TREATING AND REPAIRING METALLIC AND NON-METALLIC SURFACES

[75] Inventor: Rainer Schinabeck, Scituate, Mass.

[73] Assignee: American Velodur Metal, Inc., Scituate, Mass.

[22] Filed: Mar. 28, 1975

[21] Appl. No.: 562,969

[52] U.S. Cl.................. 260/29.1 SB; 260/37 SB; 260/47 EN
[51] Int. Cl.² ........................................ C08L 63/02
[58] Field of Search..... 260/37 EP, 47 EN, 570.5 P, 260/29.1 SB

[56] References Cited
UNITED STATES PATENTS
3,850,661  11/1974  Dreher et al. ............... 260/47 EN X
3,852,240  12/1974  Smith ......................... 260/47 EN X

*Primary Examiner*—Lewis T. Jacobs
*Attorney, Agent, or Firm*—Stanley D. Schwartz

[57] ABSTRACT

A hardenable, liquid film forming composition capable of being applied as a uniform coating and hardening to a smooth tough and adherent coating on metal and non-metal substrates. The hardened coating possesses good mechanical properties and solvent and acid resistant properties. The composition comprises:

A. a liquid epoxy resin having terminable epoxy groups and an epoxy equivalent from about 185 to 210;

B. a filler material in an amount between about 20 and 50 weight percent of said epoxy;

C. an effective amount of a dispersing agent for said filler material; and

D. a hardening additive for said epoxy resin of the structural formula:

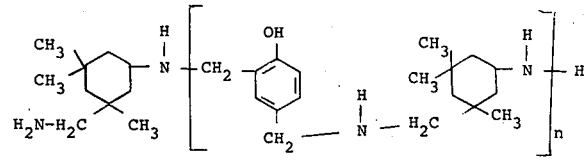

wherein n has a value of at least 2.

16 Claims, No Drawings

COMPOSITION AND PROCESS FOR TREATING AND REPAIRING METALLIC AND NON-METALLIC SURFACES

BACKGROUND OF THE INVENTION

This invention relates to solvent-free compositions useful for application to both metallic and non-metallic substrates, and more particularly to resinous compositions useful for producing hardened resinous coatings capable of protecting the substrates against the deleterious action of a wide variety of materials and chemicals including solvents, acids, heating oils, jet fuels, etc. In addition, the compositions of this invention are particularly useful for repairing defects in surfaces, e.g., holes, cracks, pits and the like. For example, the compositions are particularly suitable in molding operations in view of their ability to fill the blow-holes and the porous surfaces of castings and molds, as well as for filling of pitted or eroded surfaces thereby providing a smooth and continuous surface. The invention also relates to a new process for treating surfaces to apply a corrosion-resistant coating thereto and/or repair defects in the said surfaces.

There has been a growing need in industry for a superior resinous coating that can be applied to wet, greasy or oily surfaces or surfaces submerged under water whereby defects therein can be repaired and/or a corrosion-resistant coating applied thereto. It is particularly desirable to have a coating that can be applied without having to employ a volatile organic solvent which would otherwise require several time-consuming steps, each requiring a sufficient time to permit the volitalization of the solvent used in connection therewith. In addition, coating materials containing solvents used in the prior art for the coating of the interior of containers and used for storing flammable materials, e.g., jet fuels and heating oils, are known to increase the likelihood of an explosion occurring. A need has therefore existed for a coating composition capable of avoiding the above problems and also capable of imparting a superior, smooth, tough and adherent corrosion-resistant coating possessing good mechanical and solvent-resistant properties.

OBJECTS OF THE INVENTION

It is therefore a significant object of this invention to provide a composition capable of forming a resinous coating on a substrate that will protect the same against the deleterious action of a wide variety of materials including jet fuels, kerosene, heating oils, acids, solvents, etc.

Another significant object of this invention is the provision of a composition capable of imparting a corrosion-resistant coating on a substrate that does not require the presence of a solvent for application purposes due to its satisfactory viscosity properties.

A still further object of the invention is the provision of a coating composition for jet fuel tanks, heating oil tanks and other containers of highly flammable liquids, that is free of any volatile solvents.

Still another object of the invention is a coating composition that is capable of being applied to a wet, greasy or oily surface or a surface submerged under water.

Yet another object of the invention is the provision of a coating composition that is capable of hardening under adverse weather conditions including high humidity conditions and temperatures as low as about 5°C.

A further object of the invention is to provide a new corrosion resistant composition capable of being applied in the form of a coating to a substrate including water wetted surfaces, corroded metal surfaces, and surfaces having defects therein, e.g., blow-holes in castings or imperfect molding surfaces.

An additional object of this invention is a simple, economical and efficient process for the application of a corrosion-resistant coating to a substrate that does not require the use of any volatile organic solvents that will subsequently volatilize after application thus resulting in a savings in both processing time and materials required.

These and other objects of the present invention will become apparent when reference is made to the following description and appended claims.

BRIEF SUMMARY OF THE INVENTION

Briefly, the composition of the present invention has a fluid consistency and is capable of being applied as a uniform coating that hardens to form a smooth, tough and adherent coating, possessing good mechanical and chemical resistant properties. The composition comprises:

A. a liquid epoxy resin having terminable epoxy groups and an epoxy equivalent from about 185 to 210 and a viscosity below about 900 cps at 25°C;

B. a filler material in an amount between about 20 and 50 weight percent of said epoxy resin;

C. an effective amount of a dispersing agent for said filler material; and

D. a hardening additive for said epoxy resin of the structural formula:

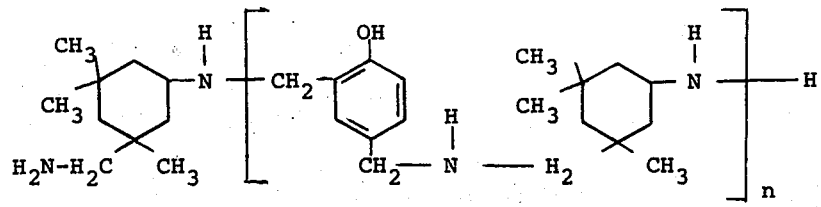

wherein $n$ has a value of at least 2.

The process of the present invention for coating a substrate comprises applying to the surface the above-identified composition and then allowing the coating to cure without the application of any heat.

DETAILED DESCRIPTION OF THE INVENTION

The liquid epoxy resins used in the practice of this invention and having an epoxy equivalent between 185 and 210 are the reaction products of epichlorohydrin and diphenylol propane and having the following formula:

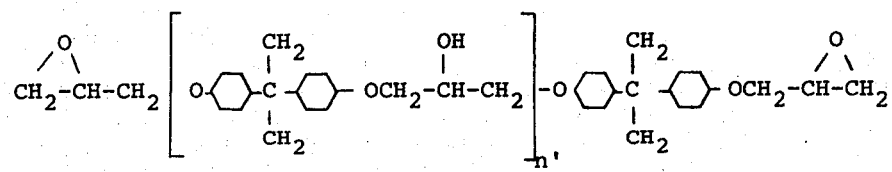

These resins have a viscosity below about 900 cps at 25° C. and preferably between about 700 to 800 cps at 25°C. The preferred value of $n'$, in the above structural formula, is approximately 0.2, whereby said resin has an approximate molecular weight of 380 although the value of $n'$ can vary between about 0 and 10. It is understood that when the above epoxy resin is produced, it is a mixture of compounds that causes the determined value for $n'$ to be an average which is not necessarily zero or a whole number such as 1.

The aforedescribed epoxy resin may be conventionally prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50°C to 150°C. The heating is continued for several hours to effect the reaction and the product is then washed free of salt and base.

A particularly preferred resin exhibiting the above properties is Epon 828 manufactured by Shell Chemical Company. Other commercial liquid epoxy resins which are equivalent to the "Epon 828" for the purposes of this invention, are "DER-331", sold by Dow Corning Corporation and "Ciba Resin 502," sold by Ciba, Ltd.

The term "epoxy equivalent" refers to the mean molecular weight of the epoxy resin divided by the number of epoxy radicals per molecule, or in any case, the number of grams of epoxy resin equivalent to one epoxy group or one gram-equivalent of epoxide.

The hardening additive present in the compositions for purposes of causing the epoxy resin described hereinbefore to harden, generally has a value wherein $n$ is greater than 2, and preferably from 2 to 5. Best results are obtained when $n$ is 2.

The preferred hardening additive (wherein $n = 2$) is prepared by stirring 6 mols phenol, 3 mols formaldehyde (in the form of a 36% formalin solution) and 0.5 weight percent of triethylamine, for about 2 hours. Nine mols of 3,5,5-trimethyl-3-aminomethyl cyclohexylamine are then added to the solution and the resultant solution is heated for about 1 hour at 100°C. The water produced during the reaction is removed by distillation.

The hardening agent produced is light yellow in color and is highly reactive with epoxy resins. Thus, compounds normally used to accelerate the hardening action are not required in the practice of this invention due to the high reactivity of the hardening agents of this invention with epoxy resins.

The total amount of hardener useful in the practice of the invention is an effective amount sufficient for causing the epoxy resin to harden. Generally, the amount of hardener used is between about 35 to 40 percent, and preferably 35 percent by weight, based on the total weight of the liquid epoxy resin described above.

It is usually desirable to add the hardening agent to the composition just prior to use, particularly because the hardening agent renders the composition readily curable at or near ordinary room temperature as well as under cold temperatures.

The compositions of this invention further contain from about 20 to 50 percent, and preferably 33 percent by weight of the epoxy resin, at least one filler which is inert with respect to the remaining ingredients of the composition and which have a particle size up to about 50 microns. Generally, the size of the filler particles range between about 25 and 50 microns.

Examples of suitable inert fillers include sand, crushed shells, rocks, aluminum powder, copper powder, quartz powder, titanium dioxide, asbestos, silica, calcium carbonate, graphite, black iron oxide, silicon dioxide, diatomaceous earth, aluminosilicates, silicone carbide, boron carbide, vermiculite, talc, mica and the like. Best results, in terms of corrosion inhibition are obtained with stainless steel flakes, steel powder, titaniferrous magnetite oxide or mixtures thereof.

The compositions of the invention also contain agents to promote the adequate and uniform distribution of filler particles in the resin. Best results are achieved when an effective amount of fumed silica is employed. Generally, between about 5 and 20 percent, and preferably 10 percent by weight of the above-described epoxy resin is employed. The fumed silica not only prevents the settlement of the filler material in the composition, but also enhances the over-all anticorrosion properties of the coating composition.

As optional ingredients for the practice of this invention, it is desired to include silicic acid in an amount of from about 1 to 7 percent by weight, and preferably 3 percent by weight of the epoxy resin. The silicic acid promotes the adhesion of the coating composition to wet, greasy or oily surfaces. Another optional ingredient is silicon oil which is employed in an amount of between about 1 and 2 ounces per 120 pounds of the total base composition. The silicon oil facilitates pigment distribution when pigments are utilized in combination with the composition of this invention. The silicon oil also decreases the surface tension of the composition and facilitates the spreading of the composition on a particular substrate.

Compositions of this invention can also contain sufficient amounts of aluminum hydroxide as a flame retardant for the composition. It is understood that other equivalent compounds can be used as a substitute for aluminum hydroxide although this compound is the preferred flame retardant additive for the invention. Generally, aluminum hydroxide is present in an amount of up to 5 percent by weight of the composition.

In general, the separate components of the composition can be admixed in any desired order and, if desired, combinations of two or more components may be prepared initially with the remaining components being added subsequently. However, as noted hereinbefore, it is usually desired to add the hardening agent just prior to use since the hardening agent renders the composition readily curable at or near room temperature with no external source of heat being required for hardening purposes.

When the above-described compositions are applied to a given substrate, the coatings are found to exhibit highly satisfactory chemical resistance to jet fuels, gasoline, heating oils, solvents, etc., as well as high compression strength, a low rate of shrinkage, good heat resistance, satisfactory thermal coefficient of expansion and adhesive properties.

The compositions of this invention may be employed for the coating and/or repair of any type of surface. These surfaces include, for example, wood, cement, metal, glass, and the like. The compositions are particularly suited for use in treating metal surfaces, such as, for example, copper, aluminum, brass, steel, and iron surfaces. The surfaces may be in any type of structure, such as for example, pipes, piling, reaction vessels, structural members of oil well drilling platforms, containers for jet fuels, heating oils and solvents, well jackets, heat exchange tubes, molds, and the like.

When the coating compositions of this invention are applied to a particular substrate to impart chemical resistance, the coating compositions are applied in an amount sufficient to provide the chemical resistance desired. More specifically, the coatings are applied in an amount sufficient to provide a film or coating of at least about 0.3 millimeters thick.

The coatings of the compositions can be applied to substrates by conventional techniques known in the art including spreading, spraying or dipping, and thereafter permitting the composition to cure at or below room temperature to form a hard, durable coating having satisfactory chemical resistance and being attractive in appearance.

Accordingly, what is claimed is:

1. A hardenable, liquid film forming composition that is capable of being applied as a uniform coating and hardening to a smooth, tough and adherent coating and possessing good mechanical and solvent resistant properties comprising:

A. a liquid epoxy resin having terminable epoxy groups and an epoxy equivalent from about 185 to 210;
   B. a filler material in an amount between about 20 and 50 weight percent of said epoxy resin;
   C. an effective amount of a dispersing agent for said filler material; and
   D. a hardening additive for said epoxy resin of the structural formula:

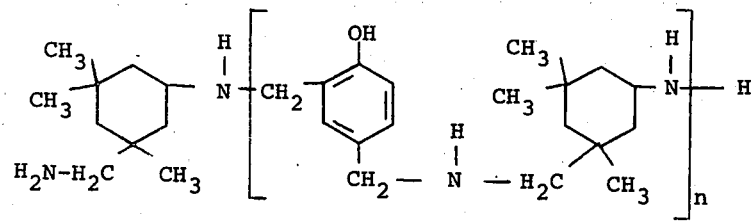

wherein $n$ has a value of at least 2.

2. The composition of claim 1, wherein said filler material is selected from the group consisting of stainless steel flakes, steel powder, titaniferrous magnetite oxide or mixtures thereof.

3. The composition of claim 2, wherein said filler material has a particle size up to about 50 microns.

4. The composition of claim 1, wherein said dispersing agent is fumed silica and is present in an amount between 5 and 20 weight percent of said epoxy resin.

5. The composition of claim 1, wherein $n$ has a value from 2 to 5.

6. The composition of claim 1 further comprising silicic acid in an amount between 1 and 7 weight percent of said epoxy resin.

7. The composition of claim 1, further comprising between about 1 and 2 ounces of silicon oil per 120 pounds of said composition.

8. The composition of claim 1, wherein said liquid epoxy resin has an approximate molecular weight of about 380 and a viscosity of below about 900 c.p.s at 25°C; said filler material is steel powder and is present in an amount of about 33 weight percent of said epoxy resin; and dispersing agent is fumed silica; said dispersing agent being present in an amount of about 10 weight percent of said epoxy resin; said hardening additive is present in an amount of about 35 weight percent based on the weight of said epoxy resin, and $n = 2$.

9. The composition of claim 8, further comprising silicic acid in an amount between 1 and 7 weight percent of said epoxy resin.

10. The composition of claim 8, further comprising between about 1 and 2 ounces of silicon oil per 120 pounds of said composition.

11. A cured composition comprising the reaction product of said epoxy resin and said hardening additive of claim 1.

12. A cured composition comprising the reaction product of said epoxy resin and said hardening additive of claim 8.

13. A method for forming a corrosion-resistant coating on a metal surface while the surface is immersed in water which comprises applying to said surface the composition of claim 1, and allowing said mixture to harden under said water.

14. The method of claim 13, wherein said filler material is steel powder and $n = 2$.

15. A method for repairing a defect in a metal or non-metal surface which comprises applying to said surface the composition of claim 1, and then allowing said composition to harden to form a smooth, tough and adherent coating and possessing good mechanical and solvent resistant properties.

16. The method of claim 15, wherein said filler material is steel powder and $n = 2$.

* * * * *